(12) United States Patent
Ezra

(10) Patent No.: US 6,594,742 B1
(45) Date of Patent: Jul. 15, 2003

(54) CACHE MANAGEMENT VIA STATISTICALLY ADJUSTED SLOT AGING

(75) Inventor: Josef Ezra, Ashland, MA (US)

(73) Assignee: EMC Corporation, Hopkinton, MA (US)

(*) Notice: Subject to any disclaimer, the term of this patent is extended or adjusted under 35 U.S.C. 154(b) by 97 days.

(21) Appl. No.: 09/850,551

(22) Filed: May 7, 2001

(51) Int. Cl.[7] .............................................. G06F 12/00
(52) U.S. Cl. ..................... 711/159; 711/160; 711/133; 711/134; 711/135; 711/136
(58) Field of Search .................. 711/159, 133, 711/134, 136, 160

(56) References Cited

U.S. PATENT DOCUMENTS

| | | | |
|---|---|---|---|
| 4,530,054 A | * | 7/1985 | Hamstra et al. ............. 711/133 |
| 5,809,527 A | * | 9/1998 | Cooper et al. .............. 711/133 |
| 6,078,994 A | * | 6/2000 | Carey ........................ 711/133 |
| 6,105,111 A | * | 8/2000 | Hammarlund et al. ....... 711/128 |

* cited by examiner

Primary Examiner—Bo Hyun Yoo
Assistant Examiner—Ngoc V Dinh
(74) Attorney, Agent, or Firm—John M. Gunther; Penelope S. Wilson

(57) ABSTRACT

The invention features a method and a system for selecting a slot within a memory unit, e.g., cache, for removal. The memory unit is accessible to a plurality of processors, and each slot in the memory unit has a corresponding entry in an age table. Each time when a processor examines one of the entries, an age value of the entry is increased. When the age value is above a maturity age, the corresponding slot becomes a removable slot. Each processor also maintains statistics to estimate the number of removable slots in the memory unit. According to the statistics, adjusts a maturity age associated with the processor dynamically and independently to control the number of removable slots. Accordingly, the number removable slots can be maintained at a pre-determined percentage relative to the total number of slots in the memory unit.

26 Claims, 4 Drawing Sheets

CACHE MANAGEMENT VIA STATISTICALLY ADJUSTED SLOT AGING

TECHNICAL FIELD

This invention relates generally to memory management, and more particularly to managing a cache in a processing system including multiple processors.

BACKGROUND

Processing systems often employ caches to store data that is frequently required for calculations or is likely to be accessed in the near future. A cache is generally built from fast memory chips, so that accessing the cache requires less time than accessing a storage device, for example, disks. Storing data in the caches, therefore, speeds up data access and increases system throughput.

When data is read from a storage device, a copy of the data is also saved in the cache, along with the address from which the data is read. The cache monitors addresses of subsequent read operations to see if any of the required addresses is already in the cache. If a required address is in the cache (i.e., a read hit occurs), then the cache immediately returns the data having the required address. Otherwise, the data is fetched from the storage device, and a copy of the data along with its address is saved in the cache.

For increased data access speed, it is generally desirable for a cache to have read hits as frequent as possible. The performance of the cache can be measured by hit ratio, the frequency of read hits relative to all data access to the cache. In addition to the speed and size of cache hardware, hit ratio also depends on data access patterns (i.e., the sequence of addresses being read and written). Cache designs often depend on two properties of the access patterns: temporal locality and spatial locality. Temporal locality means that if a data item is accessed once, it is likely to be accessed again soon; while spatial locality means that if one address is accessed, then nearby addresses are also likely to be accessed. With temporal locality, when the processor writes data to a storage device, the data should also be written to the cache to speed up subsequent access. To exploit spatial locality, caches often operate on several words, i.e., a line of data, at a time. A line of data in the cache is called a "cache line" or a "cache slot".

When the cache is full and must remove a cache slot to accommodate new data, the cache selects a cache slot to be replaced and writes it back to the storage device. The new data is then written to the cache, stored in the location where the replaced cache slot was originally stored. The decision as to which cache slot to select depends on how the cache is managed.

Generally, the selected cache slot is one that has not been referenced recently. A conventional approach for cache slot selection requires maintaining a linked list, in which each slot is linked to another cache slot by forward and backward pointers. In a system including multiple processors, accessing the link list requires a lock mechanism to prevent simultaneous access of a cache slot, thereby decreasing throughput and creating significant performance bottlenecks.

SUMMARY

The invention relates to managing a memory unit, e.g., a cache, accessible to a plurality of processors. The method selects one of a plurality of slots within a memory unit for removal. In a general aspect of the invention, the method includes: maintaining an age table containing a plurality of entries, each entry having an age value and corresponding to a slot in the memory unit; increasing the age value of the entry each time the entry is examined by one of the processors; storing, independently at each of the processors, a maturity age associated with the processor; and comparing the maturity age compared to the age value of each entry.

In another aspect of the invention, a system includes: processors; a memory unit including slots, the memory unit being accessible to the processors; an age table containing a plurality of entries, each entry having an age value and corresponding to a slot in the memory unit, the age value of each entry being increased each time the entry is examined by any one of the processors; and a maturity age independently stored at each of the processors, the maturity age being compared to the age value of each entry.

Embodiments of the above aspects of the invention may include one or more of the following features.

Each processor adjusts the maturity age dynamically according to an estimate of the number of slots that are candidates for removal. The candidates for removal include a slot that corresponds to an entry having an age value above the maturity age. According to the estimate, the processor calculates a percentage of the candidates relative to a total number of slots within the memory unit; and compares the percentage to a target percentage. The estimate is derived from an average number of slots that have been examined by the processor before the processor determines that one of the slots is removable. The processor also resets the age of an entry to zero when the processor access the slot corresponding to the entry.

If a slot is a candidate for removal, the processor removes the slots from the memory unit. The slot to be removed can be an oldest slot among the slots examined by the processor, when a pre-determined time threshold expires. The slot to be removed can also be an oldest slot among the slots examined by the processor, when the maturity age at the processor is reduced. One of the processors assigns an age value to a nonstandard slot when converting the nonstandard slot to a standard slot, the assigned age value being based on a category of the nonstandard slot. The processors can simultaneously access the age table. The memory unit can be a cache.

One approach for accelerating the selection of a slot for removal requires each of the processors running a low-priority demon to detect a prospective removable slot before the processor needs the removable slot. Each processor can run a low priority verifying demon to detect and correct errors in the age table.

The invention advantageously provides an efficient approach for managing a memory unit with an age table that allows simultaneous access, a procedure for determining the age values of standard and nonstandard slots, and a process for adjusting the number of removable slots according to statistics collected by each of the processors.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
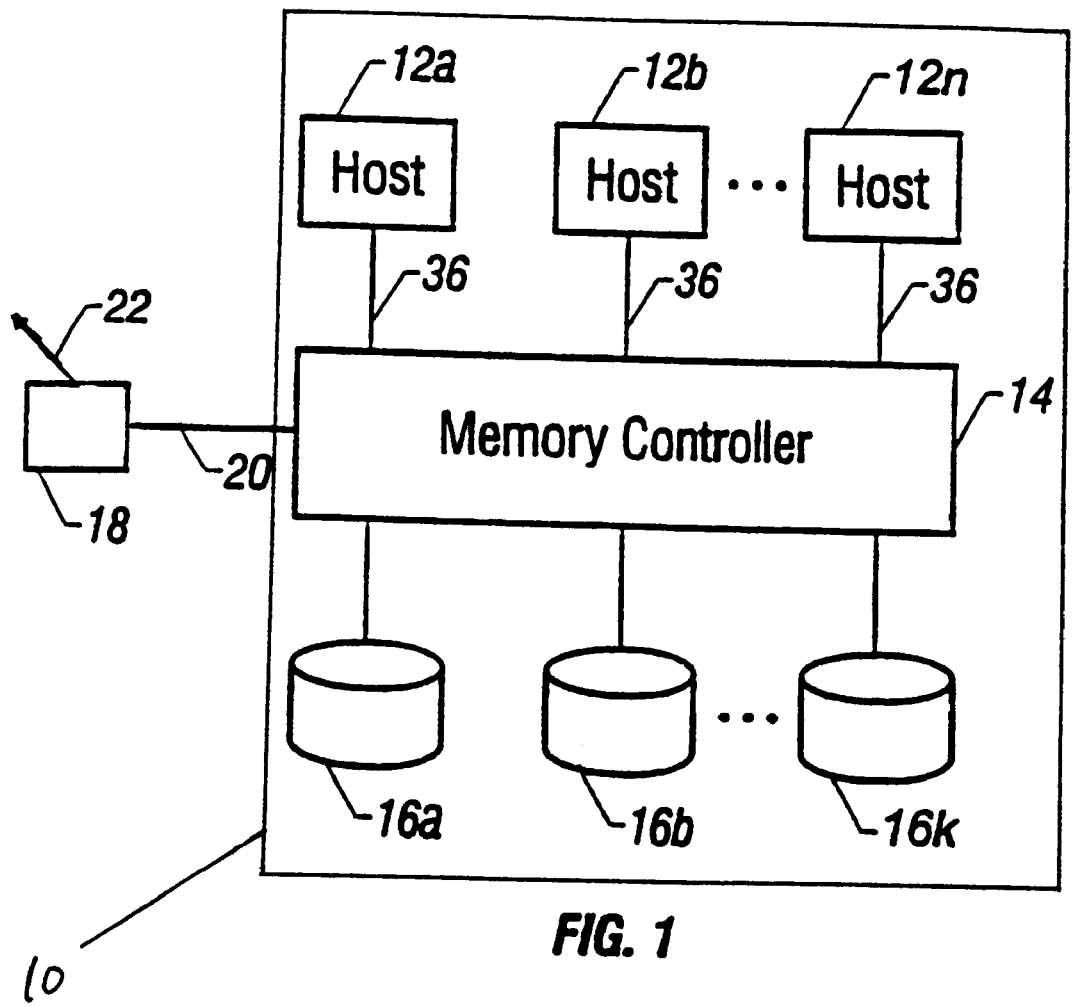
FIG. 1 is a computer system including a memory controller.

Referring to FIG. 1, a computer system 10 is shown to include hosts 12a, 12b, . . . , 12n, each of which are connected to a memory controller 14, such as the EMC Symmetrix® disk array memory system (a product of EMC Corporation, Hopkinton, Mass.). Through memory controller 14, host computers 12 can read from or write to any of disk drives 16a, 16b, . . . , 16k, each of which represents a mass storage device. A console PC 18, connected to memory controller 14 over a channel 20, is used to monitor and control computer system 10. Console PC 18 can also be used to monitor and control other computer systems at remote sites (not shown) over a telephone network via a modem connection 22.

Figure 2:
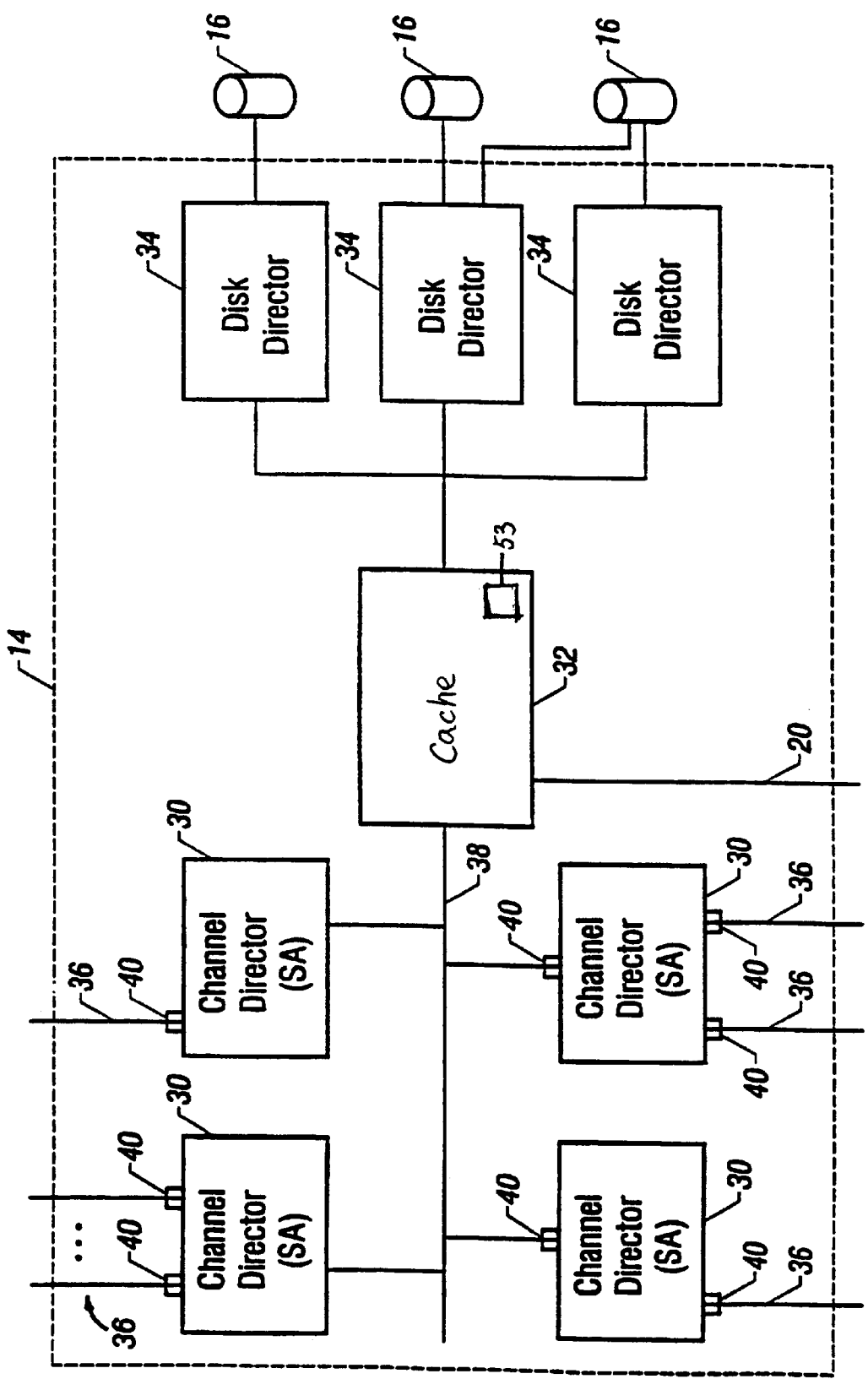
FIG. 2 shows the memory controller that includes a cache.

Referring to FIG. 2, memory controller 14 includes a cache 32 for storing data likely to be reused. Cache 32 is connected to a number of channel directors 30 and a number of disk directors 34. Channel directors 30 and disk directors 34 manage data transfer between host computers 12 and cache 32, and between cache 32 and disk drives 16, respectively. Channel directors 30 and disk directors 34 are both typically SCSI adapters (SA) and operate according to a SCSI protocol. In certain embodiments, channel director 30 can also be ESCON adapters (EA), remote Symmetrix directors (RDF), or SCSI fibers (SF). Each channel director 30 is connected to one or more host computers 12 over channels 36 and to cache 32 over channel 38; typically, one host I/O controller per port 40.

Figure 3:
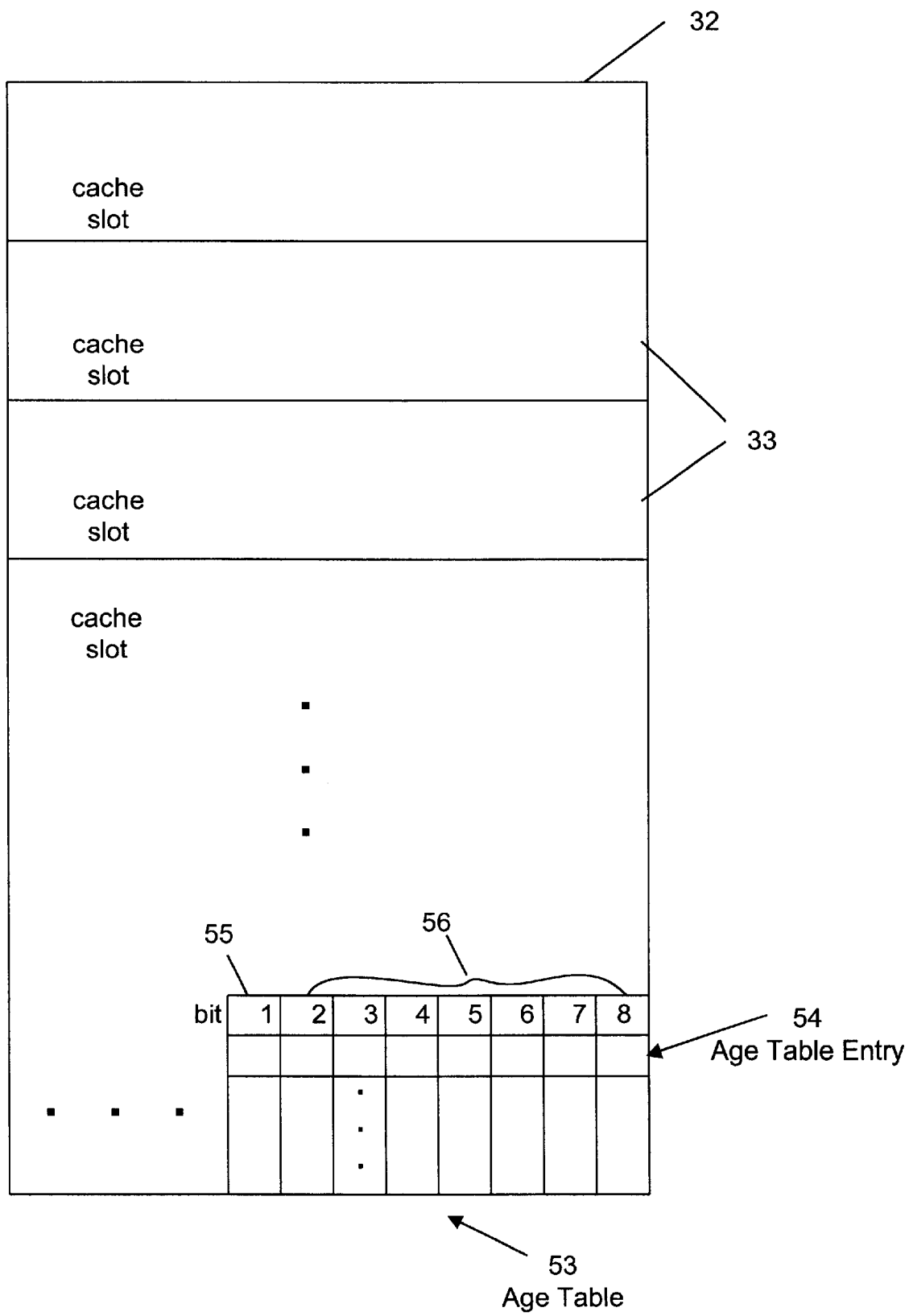
FIG. 3 illustrates the cache and an age table in the cache.

The directors of computer system 10, including channel directors 30 and disk directors 34, generally require frequent access to cache 32 so that host computers 12 can acquire data for computations, and to retrieve data from, or store data into, disk drives 16. Cache 32 includes an age table 53 that stores information associated with every cache slot 33 (FIG. 3). When a director, access cache 32 to read or write a cache slot 33, the information of that cache slot will be updated in age table 53. The updated information reflects that the cache slot 33 has been recently accessed, and will likely to be reused in the near future. When cache 32 is full and a director needs to write a new line of data into the cache, the director will check age table 53 to decide which cache slot 33 can be replaced. Age table 53 is accessible to all directors at any given time.

Referring to FIG. 3, age table 53 contains age table entries 54, each entry storing information about a cache slot 33. An age table entry 54 includes one byte; one bit 55 indicating whether or not the associated slot is a standard slot, and the remaining bits 56 indicating the number of times the entry has been examined since the most recent read hit or since the cache slot 33 being brought into cache 32. The value represented by the remaining bits 56 is an age of the cache slot 33.

The age of a cache slot is incremented by one each time the corresponding entry is examined by a director (either of channel directors 30 or disk directors 34). When the age of a standard slot reaches a specific "maturity age", the slot becomes a removable slot, which is a valid candidate selectable by a director. Each director holds a local value of the maturity age, and adjusts it dynamically and independently. The age of a slot is set to zero when it is initially brought into the cache, and the age is reset to zero when the corresponding slot is read by a director, i.e., when a read hit occurs.

There are a number of advantages for having each director maintain a local value of the maturity age. In particular, maintaining a local value allows each director to adjust the value independently without a data coherence problem caused by simultaneous access. It is also faster for a director to access the value locally than from a shared location. Furthermore, maintaining the local value allows each director to maintain a different value according to characteristics required by the director. For example, if a director points to an area of cache 32 which includes very few removable slots, the director can adjust its local value differently from those of other directors.

The maturity age held at each director is also adjusted dynamically to maintain a reasonable number of removable slots in cache 32. The lower the maturity age, the greater the number of removable slots, and the quicker it is for a director to locate one of the removable slots. However, if the maturity age is unreasonably low, e.g., one or two, the number of removable slots in proportion to the total number of slots in cache 32 will be too large. Even though a large number of removable slots will allow a director to quickly find a slot for removal, some of these slots may be reused in the near future and should not be prematurely replaced. A desirable number of removable slots, often translated into a percentage, is around 3% of the total number of slots. The percentage allows reusable slots to stay in cache 32 for a reasonable amount of time for a good hit ratio, and also allows the director to find a removal slot within a reasonable amount of time.

Since the number of removable slots in cache 32 is inversely proportional to the time required for a directory to find a removable slot, a director can monitor the required time to derive the number of removable slots. The director then adjusts the local value of the maturity age accordingly to maintain the number of removable slots, or its percentage of the total number of slots, at a desired target level.

Specifically, the director monitors the required time using statistics that estimates the number of removable slots. The statistics maintained at each director, in one scenario, is calculated from a "total" counter and a "removed" counter. The "total" counter counts the number of slots that have been examined by the director since the last time the director found a removable slot. The "removed" counter counts the number of removable slots that has been found by the director. The ratio of the two counter values represents an average number of the slots examined before the director finds a removable slot. In a mathematical discussion presented in the Appendix at the end of the description, it is shown that this average number statistically approximates the inverse of the percentage of removable slots relative to the total number of slots in cache 32. Therefore, the percentage or the number of removable slots, in this scenario, can be estimated from the ratio of the two counter values. If the percentage derived from the statistics substantially deviates from the target percentage, the director will adjust its maturity age to control the number of removable slots.

In the above scenario, the director can optionally weigh the average to further increase the accuracy of the estimation. The director can weigh the average according to the time at which the counter values are collected; for example, more weight can be given to values collected more recently.

Figure 4:
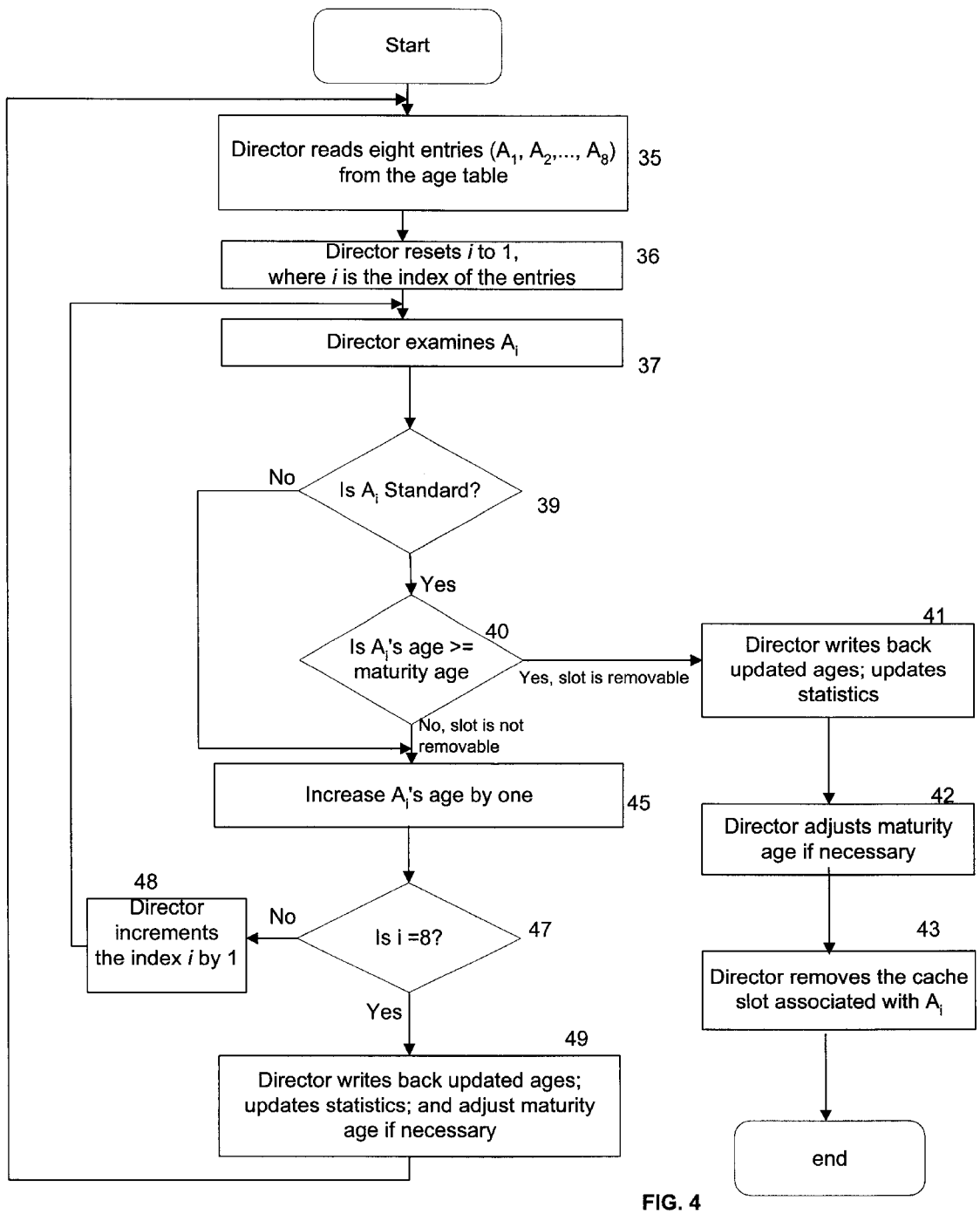
FIG. 4 is a flow diagram illustrating a process for selecting a removable slot from the cache.

Referring to FIG. 4, a flow diagram illustrates a process for searching for a removable slot from cache 32. In this example, the director reads eight entries at a time from age table 53, each corresponding to one cache slot (step 35). Each of the eight entries is indexed by an index i, where i is from 1 to 8. The director initially resets the index i to one (step 36), and examines the entry indexed by i (step 37). The entry is examined to determine if it is a standard or nonstandard slot (step 39). If the entry is a standard slot, and if the age of the slot is equal to or greater than the maturity age maintained by the director, the slot is a removable slot, and can be selected by the director (step 40). After the director selects the removable slot, the director performs a series of updates (step 41). In particular, the director resets the age of the slot to zero by writing a zero back to the corresponding entry in age table 53, and updates the statistics for estimating the number of removable slots in cache 32. The director can also adjust its local value of the maturity age, when necessary, to control the number of removable slots (step 42). The director then removes the selected slot from cache 32 (step 43).

If at step 40 the entry examined by the director indicates that the slot is not removable, the director increases the age of the slot by one (step 45). The director checks if the examined entry is the last one of the eight entries (step 47). If the entry is not the last entry, the director increments the index i by one (step 48), and continues to examine the next entry that is currently indexed by i. If none of the eight entries is removable, the director writes the increased ages back to age table 53, updates the statistics, and adjust its local value of the maturity age if necessary (step 48). The director repeats the above process until a removable slot is found.

If at step 39, the examined entry indicates a nonstandard slot, the age of the entry will not be compared with the maturity age at step 40, because a nonstandard slot can not be a removable slot. However, the age of the entry will be increased by one (step 45) just like a standard slot, and the director will continue to examine the next slot until a removable slot is found.

A nonstandard slot should not be replaced unless it is converted into a standard slot. Nevertheless, age table entries corresponding to the nonstandard slots are managed in the same manner as those of the standard slots. That is, the age of a nonstandard slot is increased when examined, and is reset to zero when a read hit occurs. Thus, when the nonstandard slots become standard, their corresponding age values will reflect the number of read hits that have occurred, and the length of time the slots have stayed in cache 32 since the last read hit. For certain types of nonstandard slots, e.g., test slots or write pending slots, the nonstandard slots can be assigned an age close to the maturity age upon returning to standard slots in order to increase hit ratio. Based on experiment results, these nonstandard slots are either read again immediately after they are written to cache 32, or will not be used again for an extensive period of time.

Nonstandard slot types generally include: write pending slots, permanent cache slots, RAID slots, side file slots, scratch slots, and test slots. For example, write pending slots are created when channel director 30 desires to write a line of data into disk drives 16. The data, marked as write-pending, is first written into cache 32, waiting for its turn to be stored in disk drive 16 by disk director 34. On the other hand, RAID (redundant array of inexpensive disks) slots are used to store data that will be redundantly stored in disk drive 16 according to a RAID process.

Referring again to the process of FIG. 4, in certain embodiments, the directors can each use a low priority demon to search for a removable slot to accelerate the process. Once a new removable slot is found, the demon forwards the index pointer to the new removable slot. Thus, when the director requests for a removable slot, the new removable will very likely remain over the maturity age and can be immediately used by the director.

Another approach for accelerating the process is to reduce the local maturity age held at each director. As a result of the reduction, more age table entries, including some of the entries just examined, will be eligible for removal. To avoid re-examining the entries that have just been examined, the director remembers the location of an oldest entry among all the entries it has examined since the last removable slot was found. Once the maturity age is reduced, the age of the oldest entry is likely to exceed the reduced maturity age. The director therefore can locate the oldest entry quickly to verify whether or not its age indeed exceeds the reduced maturity age. To accelerate the processor further, when a pre-determined time threshold expires, the director can simply remove the slot associated with the oldest entry regardless of its age in comparison with the maturity age.

As mentioned above, a distinct advantage of age table 53 is that the age table does not require a locking mechanism or locks. Without the locks on age table 53, cache management becomes more efficient and the performance of the system 10 improves. However, there are possible impairments to the reliability of age table 53 due to the absence of locks, but the impairments are either insignificant or correctable, as will be discussed below. The data in cache 32 is not affected by any of the impairments, because cache locks are still required for accessing cache 32. The cache locks assure that data stored in cache 32 will not be corrupted by simultaneous access. Thus, when a director intends to replace a removable slot with a new line of data, it still has to use a lock procedure to access cache 32.

Possible impairments to age table 53 are caused primarily by simultaneous access. As a result of simultaneous access, entries in age table 53 may be overwritten and become different from its correct and intended value. For example, assume that a first director increases the age of a slot from n to n+1, and a second director does the same simultaneously. The operations performed by both directors are read-modify-write operations, that is, the directors read the age n from age table 53, modify the age by adding one to it, and write the increased age n+1 back to the age table. Due to the simultaneous access, the resulting age of the slot becomes n+1, which is lower than its intended age n+2. However, the difference only has a minor impact on the performance of the cache, because a younger age will only slightly delay the time required for writing back the affected slot.

Another example of simultaneous access occurs after a read hit on a cache slot. When the first director sets the age of the slot to zero due to the read hit, the second director, slightly lagging behind in its read-modify-write operation, increases the age from n to n+1. As a result, the slot's age becomes n+1, which is older than its intended age 1. Such an event, if allowed to happen frequently, might have an impact on performance because the slot would leave the cache much earlier than it should have. However, the probability of this event occurring is very low. Moreover, it is very likely that another read hit will soon occur on the slot, thus correcting the situation.

Yet another situation can occur when a nonstandard slot is erroneously recorded in age table 53 as a standard slot. This situation is innocuous, however, because a director will discover the error when it selects the slot and tries to lock the slot in cache 32. The director will find out that the slot is nonstandard because cache 32 records the correct information. Once the error is discovered, the director will correct the slot type in age table 53 to nonstandard and continue searching for a removable slot.

A more complex situation arises when a standard slot is erroneously recorded in age table 53 as a nonstandard slot. In this situation, even if the age of the slot reaches a maturity age, no director will try to lock the slot for reuse because a nonstandard slot is not eligible for removal. The situation can be corrected, however, by a low-priority verifying demon that each director runs on the director's idle processing cycles. The verifying demon compares every table entry and its corresponding slot, and verifies the correctness of the bit in every entry that indicates whether or not the corresponding slot is a standard slot. The verifying demon is also able to detect and correct errors in age table 53. Running the verifying demon on every director allows less busier directors to verify the correctness of age table 53 for those busier directors.

Other possible approaches for reducing the amount of incorrectly overwritten data in age table 53 include minimizing the time that each director spends on performing operations that modify the age table entries, e.g., read-modify-write operations. When the time for such operations is minimized, the probability of simultaneous operations on the same age table entry will be also reduced.

Other embodiments are within the scope of the claims.

What is claimed is:

1. A method for managing a memory unit that is accessible to a plurality of processors, the method comprising:

maintaining an age table containing a plurality of entries, each entry corresponding to a slot in the memory unit and having an age value;

increasing the age value of the entry each time the entry is examined by one of the plurality of processors;

storing, independently at each of the processors, a maturity age associated with the processor; and each of said plurality of processors independently comparing the maturity age to the age value of each entry, each of said plurality of processors substantially simultaneously operable to determine slot removability based on said comparing step.

2. The method of claim 1 further comprising adjusting the maturity age dynamically at each of the processors according to an estimate of the number of slots that are candidates for removal.

3. The method of claim 2 wherein the candidates for removal include a slot that corresponds to an entry having an age value above the maturity age.

4. The method of claim 2 wherein adjusting the maturity age includes:

according to the estimate, calculating a percentage of the candidates relative to a total number of slots within the memory unit; and comparing the percentage to a target percentage.

5. The method of claim 2 wherein the estimate is derived from an average number of slots that have been examined by the processor before the processor determines that one of the slots is removable.

6. The method of claim 1 further comprising, if the slot is a candidate for removable, removing the slot from the memory unit.

7. The method of claim 6 wherein removing the slot includes removing an oldest slot among the slots examined by the processor, when a pre-determined time threshold expires.

8. The method of claim 6 wherein removing the slot including removing an oldest slot among the slots examined by the processor, when the maturity age at the processor is reduced.

9. The method of claim 1 further comprising assigning an age value to a nonstandard slot when the nonstandard slot is converted to a standard slot, the assigned age value being close to the maturity age.

10. The method of claim 1 wherein the age table allows simultaneous access by the plurality of the processor.

11. The method of claim 1 further comprising running a low-priority demon at each of the processors to detect a prospective removable slot before the processor needs to remove a slot.

12. The method of claim 1 further comprising running a low priority verifying demon at each of the processors to detect and correct errors in the age table.

13. The method of claim 1 further comprising resetting the age value of an entry to zero when the processor accesses the slot corresponding to the entry.

14. A system comprising:

a plurality of processors;

a memory unit including a plurality of slots, the memory unit being accessible to the processors;

an age table containing a plurality of entries, each entry having an age value and corresponding to a slot in the memory unit, the age value of each entry being increased each time the entry is examined by any one of the processors; and a maturity age independently stored at each of the processors, each of said plurality of processors operable to substantially simultaneously compare the maturity age to the age value of each entry to assess slot removability based on said comparison.

15. The system of claim 14 wherein each of the processors adjusts the maturity age dynamically according to an estimate of the number of slots that are candidates for removal.

16. The system of claim 14 wherein the candidates for removal include a slot that corresponds to an entry having an age value above the maturity age.

17. The system of claim 15 wherein, according to the estimate, each of the processors calculates a percentage of the candidates relative to a total number of slots within the memory unit; and compares the percentage to a target percentage.

18. The system of claim 15 wherein the estimate is derived from an average number of slots that have been examined by the processor before the processor determines that one of the slots is removable.

19. The system of claim 14 wherein, if one of the processors finds a slot being a candidate for removal, the processor removes the slot from the memory unit.

20. The system of claim 19 wherein the processor removes an oldest slot among the slots examined by the processor, when a pre-determined time threshold expires.

21. The system of claim 19 wherein the processor removes an oldest slot among the slots examined by the processor, when the maturity age at the processor is reduced.

22. The system of claim 14 wherein one of the processors assigns an age value to a nonstandard slot when converting the nonstandard slot to a standard slot, the assigned age value being close to the maturity age.

23. The system of claim 14 wherein the age table allows simultaneous access by the plurality of the processor.

24. The system of claim 14 wherein each of the processors runs a low-priority demon to detect a prospective removable slot before the processor needs to remove a slot.

25. The system of claim 14 wherein each of the processors runs a low priority verifying demon to detect and correct errors in the age table.

26. The system of claim 14 wherein the memory unit is a cache.

* * * * *